July 26, 1966  R. A. M. SCHENCK  3,262,228
BLAST CLEANING APPARATUS
Filed July 31, 1962  10 Sheets-Sheet 1

Fig. 1

INVENTOR.
R. A. M. Schenck
BY
Richards & Geier
ATTORNEYS

July 26, 1966  R. A. M. SCHENCK  3,262,228
BLAST CLEANING APPARATUS

Filed July 31, 1962  10 Sheets-Sheet 2

INVENTOR.
R.A.M. Schenck
BY
Richards & Geier
ATTORNEYS

Fig. 11

July 26, 1966 R. A. M. SCHENCK 3,262,228
BLAST CLEANING APPARATUS
Filed July 31, 1962 10 Sheets-Sheet 7

Fig. 11a

INVENTOR.
R. A. M. Schenck
BY
Richards & Geier
ATTORNEYS

July 26, 1966  R. A. M. SCHENCK  3,262,228
BLAST CLEANING APPARATUS
Filed July 31, 1962  10 Sheets-Sheet 9

INVENTOR.
R.A.M. Schenck
BY
Richards & Geier
ATTORNEYS

United States Patent Office 3,262,228
Patented July 26, 1966

3,262,228
BLAST CLEANING APPARATUS
Robert A. M. Schenck, Wilrijk, near Antwerp, Belgium, assignor to Mercantile Marine Engineering & Graving Docks Co., Naamloze Vennootschap, Antwerp, Belgium, a company
Filed July 31, 1962, Ser. No. 213,784
Claims priority, application Belgium, May 11, 1962, 617,521
7 Claims. (Cl. 51—9)

This invention relates to the technics for blasting metallic surfaces, respectively for cleaning descaling and any other similar operation by projecting small elements having a high hardness.

This invention relates more particularly to the surface treatment of sheets and still more particularly of the external surface of the shell of the metallic ships.

Heretofore, this operation was effected by projecting a finely divided hard material through a generally flexible tube issuing from a projecting device and held by the worker opposite to the surface being treated. It is well known that this operation is very heavy, unhealthy and often dangerous, namely when the worker has to operate on very high surfaces, requiring platforms or scaffoldings.

It is an object of this invention to substitute quite novel, very easy, salubrious and highly efficient technics for these old technics, since the work may be carried out by only one worker without taking any particular precaution or protection, the operation being very substantially more rapid and more complete than by the known means and the worker being completely sheltered from the material projections and the blasting waste products. For this purpose, the process according to the invention comprises securing the surface being treated, applying the chamber of the projecting device against the surface being treated, providing a tight contact between the said chamber and the said surface and shifting the said chamber along the said surface firmly secured against motion, so as to sweep all the surface being treated.

It is also an object of the invention to provide any apparatus capable of carrying out said process. This apparatus is essentially characterized by the combination of at least a vehicle, a device for projecting small hard bodies, between the said projecting device and the said vehicle, a linked support for contacting the said projecting device with the surface being treated, a filtering means carried by the said vehicle and connected with the said projecting device, a propelling means and driving, control and safety means.

More particularly for the surface treatment of horizontal or slightly inclined, plane or curved surfaces, the carriage of the machine consists substantially of a frame, two sets of wheels, at least one of which is a driving set, a driving means for the said driving set, a steering mechanism acting on at least one of the two sets of wheels, to the front side of the said frame, an instrument board and a platform carrying a seat for the worker with a driving member for the steering mechanism, at the middle side, a linked support capable of bringing the projecting device in its correct characteristical positions and, to the rear side of the said frame, a filtering means with the withdrawal of filtered air and a removable vessel for the powdery waste products resulting from the said surface treatment.

In view of the surface treatment of vertical or very inclined, plane or curved surfaces, the carriage of the machine may consist substantially of a frame, two sets of wheels, at least one of which is a driving set, a driving means for the said driving set, a steering mechanism acting at least on one of the two sets of wheels, to the front side of the said frame, an instrument board and a platform carrying at least a seat for the worker with a driving member for the steering mechanism, at the middle side, a telescopic framework capable of bringing the projecting device in its correct characteristical positions and, to the rear side of the said frame, a filtering means with the withdrawal of filtered air and a removable vessel for the powdery waste products resulting from the said surface treatment.

These machines may be realized under essentially varying embodiments and they may comprise essentially varying mechanisms, instruments and driving, control and safety means.

Within the scope of the appended claims, the invention covers at least all the characteristical arrangements more fully described hereafter as well as all the equivalent arrangements or those having the same function.

Thus, a more detailed description will be given hereafter only by way of example and without any limitation, with reference to the enclosed drawings, in which.

The apparatus according to the invention may be provided either solely for the treatment of horizontal or slightly inclined, plane or curved surfaces, or solely for vertical or very inclined, plane or curved surfaces, or still simultaneously for the treatment of any plane or curved, horizontal or vertical, slightly or very inclined surfaces.

For a better understanding, the enclosed drawings show on one hand, in FIGURES 1 to 11, an apparatus for the treatment of horizontal or slightly inclined, plane or curved surfaces and, on the other hand, in FIGURES 12 to 15, an apparatus for the treatment of vertical or very inclined, plane or curved surfaces.

The apparatus shown in FIGURES 1 to 11 comprises, in its essential elements, the combination of a carriage A, a device B for projecting small hard bodies and a filtering means C.

The carriage A consists substantially of a frame 1 carried by wheels 2–3, 4–5, the one or the two sets of which may be driving sets. In that case, the wheels 2–3 of the front set are driving. For this purpose, they may be driven through known means by an electric motor 6 through an appropriate reducing gear 7 connected, on one hand, with the said motor 6 by a belt 8 and, on the other hand, with the driving mechanism 9 of the front set axle through a suitable clutch 10.

In the represented embodiment, the steering acts only on the front set, while it might act on both sets of the carriage.

Figure 1:
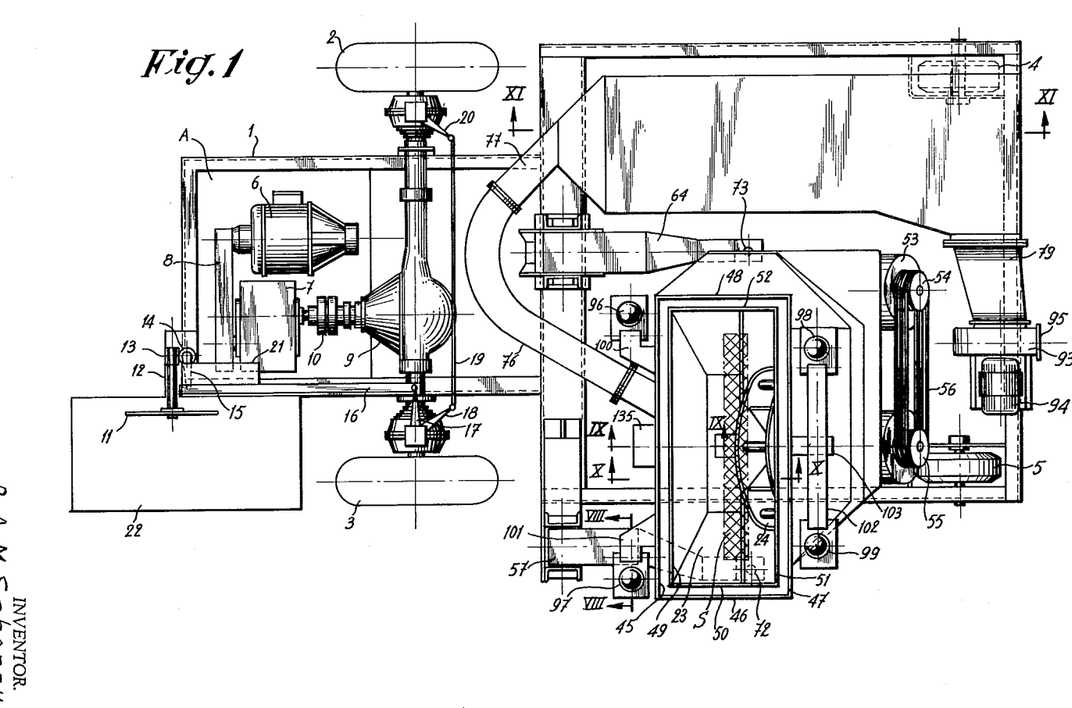
FIGURE 1 shows a plan view of the essential elements of an apparatus according to the invention, more particularly provided for treating horizontal or slightly inclined, plane or curved surfaces.

As diagrammatically represented in FIGURE 1, the steering mechanism comprises substantially a steering wheel 11, the axis 12 of which carries a worm 13 meshing with a helical wheel 14. On the axis of the latter, there is fixed a lever 15 linked to the end of a rod 16, the other end of which is linked to the end of a lever 17 acting on the steering rods represented in 18-19-20. To the front side and near the said steering wheel 11, there is disposed the board 21 including the different control and signalizing instruments. A platform 22, on which a seat (not represented) may be provided, is intended for the sole worker driving, watching and controlling the apparatus. This seat may be directed frontwards or rearwards according to the work to be carried out and the safety and ease conditions required by the said work.

The projecting device B comprises substantially a head, a linked support and a safety means. The head of the projecting apparatus comprises substantially a tank 23 and a rotating projecting means 24. The tank 23 has a straight section of rectangular shape, so as to cover some surface of the sheet being treated. At its underside, the said tank has a relatively long and narrow cover 25, through which it is connected with the outlet of the centrifugal projecting means 24.

The said tank 23 has different internal walls to direct correctly the small elements of hard material towards the surface being treated, to return the said elements in the circuit of the rotating projecting means after use and to allow the withdrawal of air charged with powdery waste products resulting from the action of the hard elements to the filtering means C.

According to an essential feature of the invention, the peripheral edge of the said tank 23 is situated in a plane X—X inclined with respect to the projecting axis Y—Y. The said internal walls of the tank 23 are as follows: a first wall 26 goes from the rear longitudinal edge of the opening 25 and extends up to near the plane X—X and a second wall 27 parallel with the wall 26 goes from the front longitudinal edge of the said opening 25 and extends only on a portion of the height of the tank 23, the free upper edge of the said wall 27 being folded outwards with respect to the said opening 25, to form a small inclined plane 28. The said wall 27 outlines in a manner a chamber 29 to receive the elements after the impact on the surface being treated disposed in the plane X—X, the bottom of this chamber 29 having an opening 30 facing the inclined plane 31 formed by the adjacent portion of the tank 23 and leading to the inlet 32 of the centrifugal projecting means 24. In the chamber 33 defined by the said inclined plane 31 and the adjoining portions of the projecting tank, there is disposed a slide 34 which may provide a sealing through a resilient end part 35, the said slide being duly controlled by a safety means which will be described hereafter.

A third wall 36 is disposed at some distance and in a parallel direction with the front face 37 of the projection tank, which has an outlet opening 38, opposite to which is disposed inwards the tank a deflector 39, the lower part of which directed in the chamber 29 has several relatively reduced holes 40 serving as a grating.

Finally, between the said first internal wall 26 and the back wall 41 of the tank, there is interposed a fourth internal wall 42 outlining a back chamber 43 having lower openings 44 leading into the channel defined by the said walls 26-27 extending the outlet of the centrifugal projecting means. All the internal walls of the tank will be advantageously provided to present a good resistance, namely to abrasion, under the effect of small hard elements moved at a high speed as well when they are projected as when they are returned after the impact on the treated surface.

Preferably, the said walls will be provided with a lining of a very resilient material, such as rubber or a suitable synthetic resin.

Advantage may be taken of these resilient linings to combine them with the tight and safety closing on the edge of the projection tank 23. In that case, as represented more specifically in FIGURES 1 and 10, this tight and safety closing of the projection tank is realized by extending, beyond the constituting adjoining walls of the projection tank, a rubber lining, thereby forming two resilient and adjoining frames 45-46-47-48 and 49-50-51-52. The said pulsating means 24 may be driven at a very high speed through an electric motor 53, the axis of which is connected to the axis of the said centrifugal projecting means through pulleys 54-55 and belts 56 respectively, the said driving means, the centrifugal projecting means and the projection tank forming together a compact assembly constituting a moving equipment which may be brought into the rest position or any suitable working position by means of a linked support. The latter is provided so that a tilting movement may be imparted to the said projection tank about three orthogonal axes, thereby making it possible to apply the apparatus according to the invention to any plane or curved, horizontal or slightly inclined surfaces, whatever the relative position with respect to the apparatus may be. In addition, the latter might be also applied to some skew surfaces, of course within certain limits.

The said moving support consists namely of two arms, one of which may be rotated about an axis and the other of which may be moved about two orthogonal axes. In the represented embodiment, the first arm 57 may be rotated about the axis 58 under the action of a linked jack 59, on one hand, through the axis 60 on the said arm 57 and, on the other hand, through the axis 61 on the gusset 62 making part both of the frame 1 and a fixed post 63, on the top of which leans the said axis 58. As regards the second arm 64, likewise the previous arm, it may be rotated about the axis 65 under the action of a linked jack 66, on one hand, through the axis 67 on the said arm 64 and, on the other hand, through the axis 68 on the gusset 69 making part of the post 70, on the top of which leans the said axis 65. The said post 70 is itself linked to an axis 71 perpendicular to the said axis 65 and leaning on the frame 1, the said arm 64 being thereby able to turn about the orthogonal axes 65-71. The said jacks 59-66 will be preferably driven by hydraulic means, being however understood that any driving power or any known driving means (not represented) could be applied thereto.

The said projection tank 23 leans on the said arm 57-64 through spherical knuckles 72-73 engaged with suitable female parts 74-75 respectively, provided at the end of the said arm.

The filtering means C is connected with the projection tank through the flexible tube 76 connecting the mouth piece 38 of the said tank with the inlet 7 of a filtering chamber 78, which has an outlet 79 opposite the said inlet 77. The proper filter is disposed within the said chamber 78 between the said inlet and outlet 77-79 respectively. The said filter consists of two pairs of upper sills 80-81 and two pairs of lower sills 82-83 connected two by two by a series of cross-bars represented in 84, 85 respectively. The proper filtering element leans on the said cross-bars, namely through a flexible and thin strip 86 staggered between the said cross-bars 84, 85, on which it leans. This strip 86 is disposed to form in a manner a shield between the inlet 77 from the centrifugal projecting means and the air outlet 79. The said filter is provided with a shaking means to remove periodically therefrom the adhering solid particles, which might reduce progressively the efficiency thereof.

This shaking means may be of any type, in which known means are applied. In the present case, it consists of a number of cross-bars 87 interposed between all or some of the zigzags. These cross-bars are leaning on a frame represented in 88 and linked to the ends of connecting rods 89–90, the other ends of which are linked to the said upper sills 80–81, respectively. A rapid alternating translation movement may be imparted to the said frame 88 through the electric motor 91 and a suitable kinematic linking 92 with an excenter or any other known member. The said kinematic linking between the said motor 91 and the said shaking means is such that a rapid alternating translation movement may be imparted to the cross-bars 87, so that they are striking alternatively the folds surrounding them.

The shakes thus imparted to the proper filter 86 are such that all the adhering solid particles are loosed and fall freely in the underlying chamber 78. The latter is moving, so that it may be periodically separated from the empty apparatus. This fitering means is completed by a fan 93, the inlet of which is connected with the said outlet 79 of the filtering chamber. This fan is driven by an electric motor 94 and the outlet of the fan is directed outwards the apparatus and may lead either to the atmosphere or to a conduit in view of any use.

The apparatus is completed by safety means made integral according to the intended purposes and results, i.e. maximum safety conditions and efficiency. For this purpose, it is essential that the centrifugal projecting means 24 may be moved only when the projection tank B is tightly applied against the surface being treated, thereby leaving no gap between the resilient linings of the edges thereof and the said surface being treated. In fact, any undue outlet of shots must be prevented between the tank and the adjoining portion of the metallic surface being treated. In addition, it seems also essential that the centrifugal projecting means be fed with shots only from the time, where it has reached its working rotating speed.

Accordingly, the circuit of the motor 53 driving the centrifugal projecting means is controlled by a number of electric contacts or switches, which are in turn controlled by the correct positioning of the projection tank against the surface being treated. In the present case, four such contacts or switches represented in 96, 97, 98, 99 are distributed around the said tank. The two first contacts are mounted on supports 100–101 respectively, fixed with respect to the projection tank 23, while the two contacts 98, 99 are each mounted on the end of a rocking lever 102 mounted on an intermediate axis 103 integral with the said tank 23 and disposed in a parallel direction with respect to the rotating axis of the centrifugal projecting means.

Figure 8:
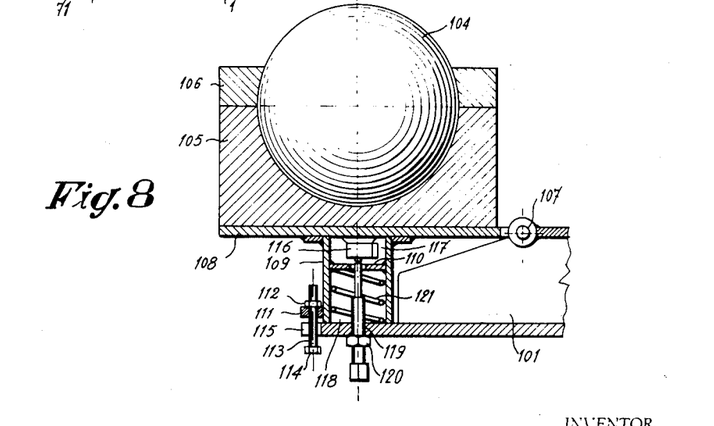
FIGURES 8, 9, 10 and 11 show sections on the lines VIII—VIII, IX—IX, X—X and XI—XI of FIGURE 1.

As represented more particularly in FIGURE 8, such contacting device comprises substantially a mass 104 consisting, e.g. of a metallic sphere. The latter is fastened on a seat 105 through a holding ring 106. This assembly is integral with a support capable of swinging about the horizontal axis 107 leaning namely on the support 101 integral with the projection tank 23. The moving support consists of a plate 108 extended at its lower portion by a small internally subdivided bushing 109 and a horizontal wall 110. The said bushing is externally integral with an appendage 111, which the threaded rod 113 may be adjusted and secured into the correct position by a nut 112, the head 114 of the said threaded rod serving as a stop. Between the appendage 111 and the head 114, the said rod 113 traverses a notch 115 of the support, namely 101.

The proper contactor or micro-switch 116 is housed in the upper compartment 117 of the said bushing 109 and it is fastened to the lower face of the said swinging plate 108. The said micro-switch is connected to the electric board 21, from which the feeding circuits of the motors 6–53–91–94 of the apparatus are going out in a well known manner. The lower compartment 118 of the said bushing 109 is provided axially with a stop rod 119 passing through the support 101 and it is screwed into the said support and secured in a correct position by the nut 120. This stop rod passes through the internal wall 110, so that its free end is situated opposite to and near the contact 116. A release spring 121 is disposed between the said intermediate wall 110 and the corresponding portion of the support 101 around the stop rod 119.

All these elements are provided and disposed so that, only when the projection tank 23 is everywhere correctly applied against the surface being treated, the feeding circuits of the said driving motor 53 of the centrifugal projecting means 24 may be closed. On the other hand, to allow the feeding of the centrifugal projecting means with the shots upstream the said projecting means, i.e. in waiting position, only when the said projecting means has reached its working speed, the said feeding is controlled by the above slide 34 and the movements or the positions of this valve are controlled by an electro-magnetic device, the feeding circuit of which is itself controlled by the rotating speed of the centrifugal projecting means 24.

Figures 9, 10:
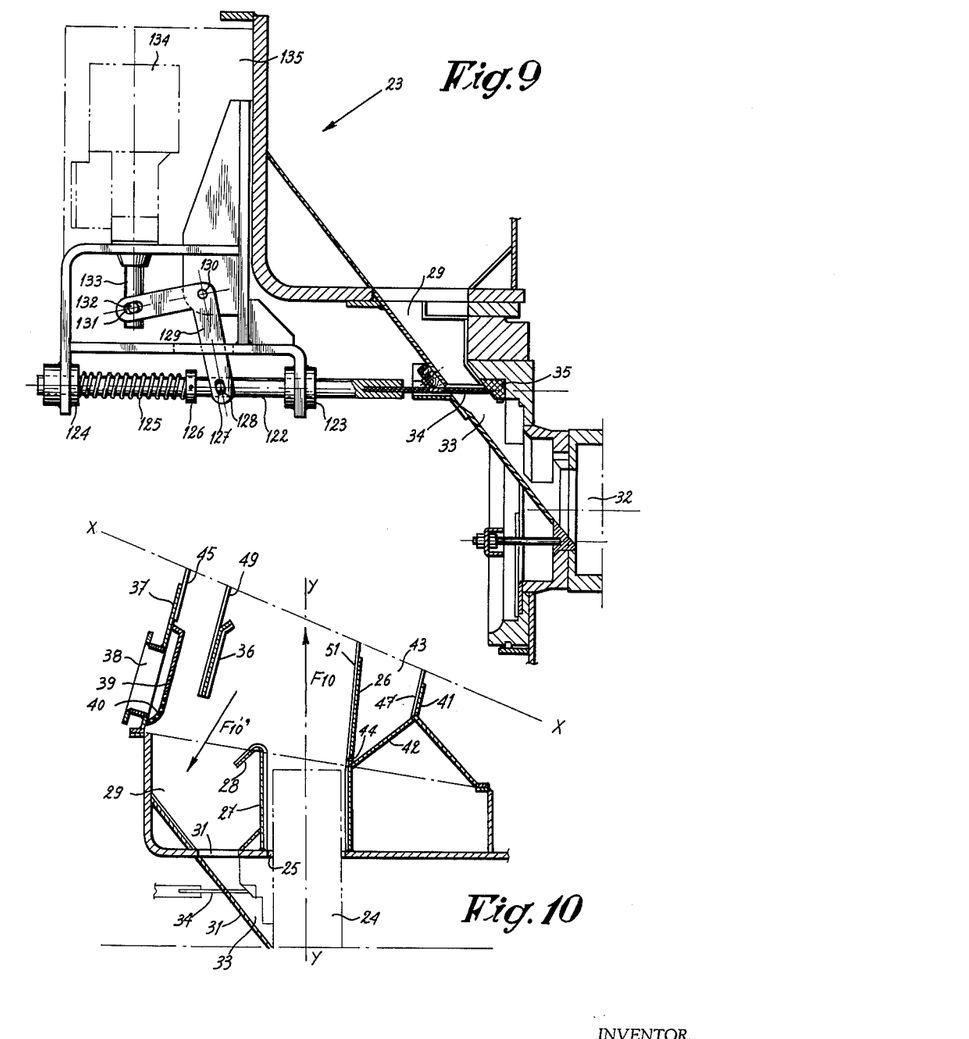

As represented particularly in FIGURE 9, the said slide 34 extends a rod 122 supported with an easy fit by two collars 123–124, made integral with the adjoining portion of the wall of the projection tank 23. The said rod 122 and the shutter 34 are permanently returned into the closing position of the passage between the compartments 29 and 33 through the intermediary of the release spring 125 interposed between the back collar 124 and a ring 126 fixed on the said rod 122. The latter has a lug 127 passing through the oblong port 128 provided near the free end of one of the legs of a bent lever 129. The latter may swing about a fixed pin 130 and near the free end of the second leg, it has also an oblong port 131. The latter is traversed by a lug 132 projecting on the side portion of the moving core 133 of the electro-magnetic device 134, which is also made integral with the projection tank 23. The feeding circuit of the winding of the said electro-magnetic device 134 is controlled by any contact, which is in turn controlled by the speed of the centrifugal projecting means 24 or its driving motor 53 or any other moving device, the speed of which is made depending from that of the said centrifugal projecting means 24. In any case, this known means must be such that the electric feeding circuit of the magnetic device 134 may be closed only when the said centrifugal projecting means has reached its working speed. By way of example, a contact tachometer may be readily used to that, when the said tachometer indicates a speed in correlation with the working speed of the centrifugal projecting means 24, it closes an electric contact controlling the feeding circuit of the said magnetic device 134. On the other hand, if an apparatus with constant characteristics would be concerned, the feeding circuit of the said magnetic device 134 could be readily controlled by a delayed relay, the electro-mechanical characteristics of which would be previously determined in terms of the interval between the starting time of the centrifugal projecting means 24 and the time, where it has reached its working speed. The said electro-mechanical device will be advantageously housed in a tight casing 135.

Figure 2:
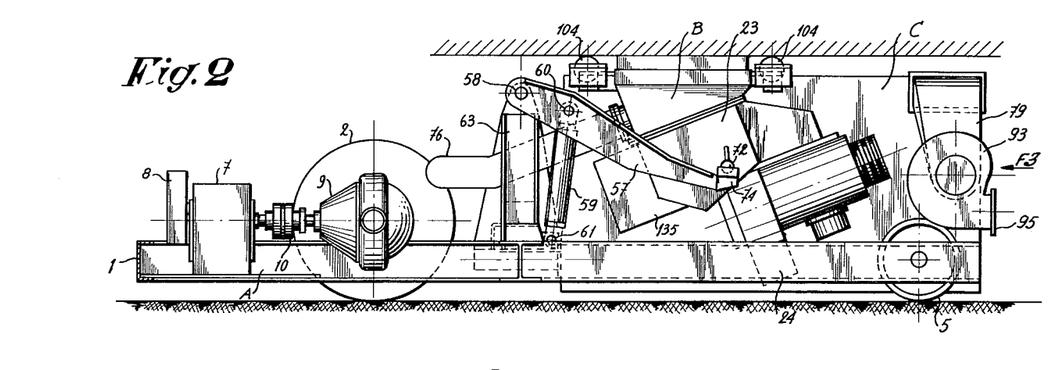
FIGURE 2 is a vertical section of the object shown in FIGURE 1.
Figure 3:
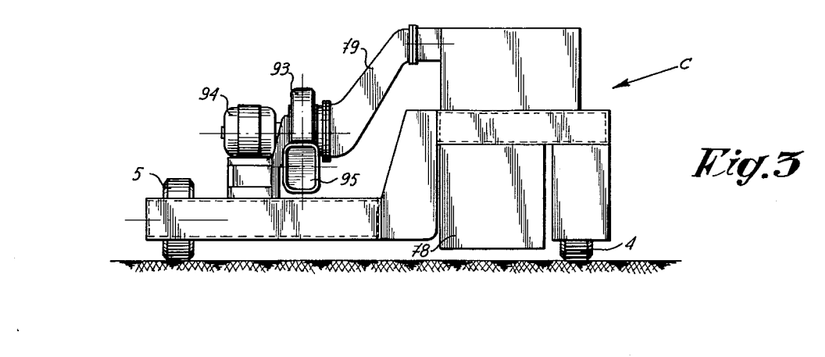
FIGURE 3 is a view according to the arrow F3 of FIGURE 2, showing the back elements of the apparatus.
Figure 4:
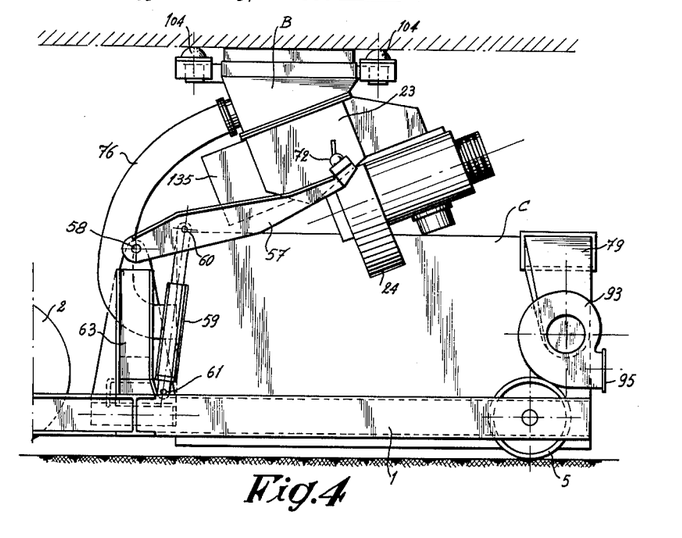
FIGURE 4 is a fragmentary view of FIGURE 2, showing the projecting device in a working position.
Figure 5:
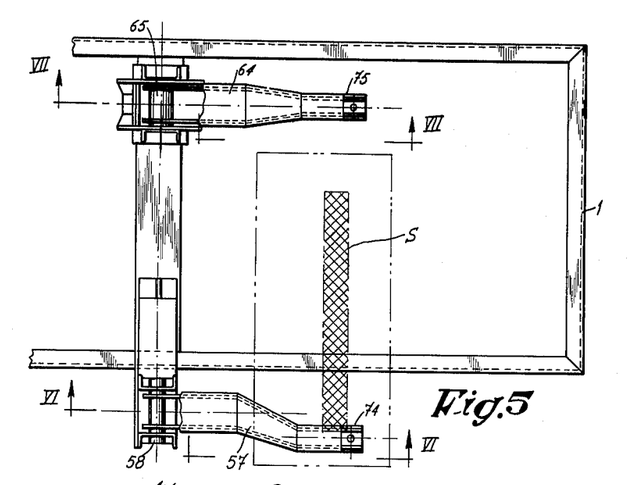
FIGURE 5 is a plan view of the linked means of the projecting device.
Figures 6, 7:
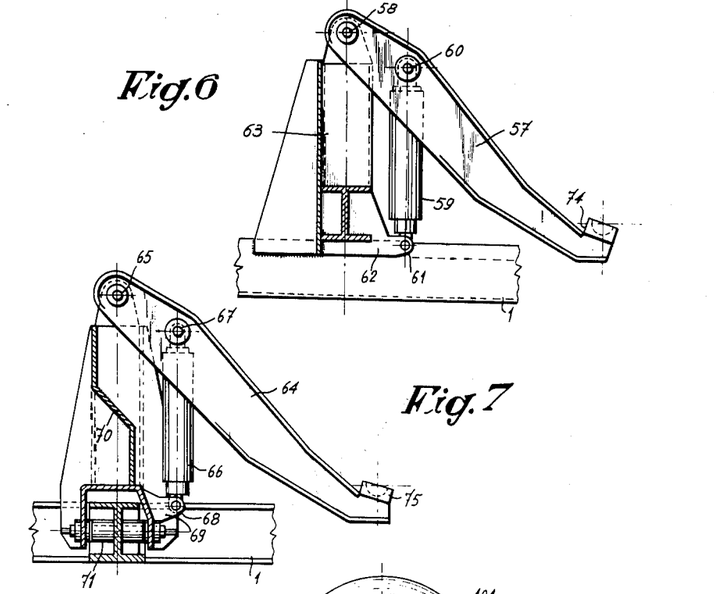
FIGURES 6 and 7 show a section and a fragmentary view on the lines VI—VI and VII—VII of FIGURE 5 respectively.

The so-assembled apparatus operates very simply and substantially as follows: at the starting, it lies in the position represented in FIGURE 2; the board 21 is connected to a source of electric current and a finely divided hard material is partially in the centrifugal projecting means 24 and partially in the compartment 29 above the slide 34, which is in closed position. The spherical masses 104 are, in their high position, under the stress of the release spring 121, the contacts or micro-switches 116 being thereby opened.

The apparatus is brought under the metallic surface being cleaned, blasted or descaled, the projection tank 23 being disposed opposite to the said surface being treated. At that time, the jacks 59–66 are moved to bring the resilient lining 45–52 of the projection tank against the corresponding portion of the surface being treated.

This tight contact being provided, the four spherical masses 104 are contacting the said surface being treated and the projection tank continuing its upwards movement under the said jacks 59–66, the supports 108 are swinging about their relative axis 107, thereby bringing finally the contacts 116 into contact with their relative stop rod 119. All the said contacts 116 being thereby actuated, the worker may drive from the board 21 the centrifugal projecting means 24 by closing only the switch controlling the feeding circuit of the motor 53 thereof. The said projecting means reaches progressively its working speed while projecting the shots lying between the blades thereof, without being normally supplied, the major proportion of the shots being kept in the compartment 29 above the slide 34. When the centrifugal projecting means 24 has reached its working speed, the energizing circuit of the magnetic device 134 is closed through a tachometric contact. The moving core 133 raises suddenly, while rotating the bent lever 129 about its axis 130, resulting in a substantially instantaneous withdrawal of the rod 132 and the slide 34, respectively. At that time, the centrifugal projecting means 24 having reached its working speed, the shots are flowing freely from the upper compartment 29 on the inclined plane 31 towards the centrifugal projecting means 24. From the board 21, the worker closes the circuits of the motors 91–94 of the filtering device. The filtering chamber is set in underpressure by the fan 93, whereas the shaking device of the proper filter is actuated by switching motor 91. It is apparent from the above that the apparatus includes means providing a tight junction between the outlet and the surface to be treated, as well as means producing the jet only when the centrifugal projecting means acquired the necessary rotary speed.

Figure 11:
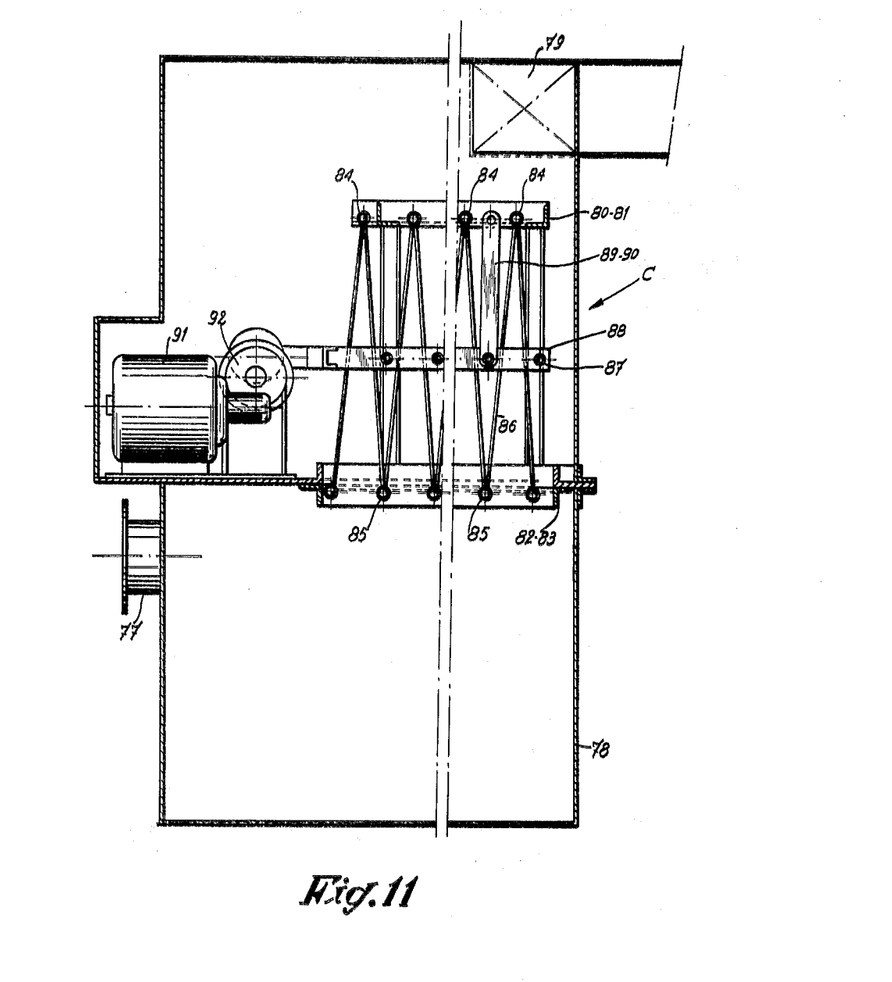
Figure 11A:
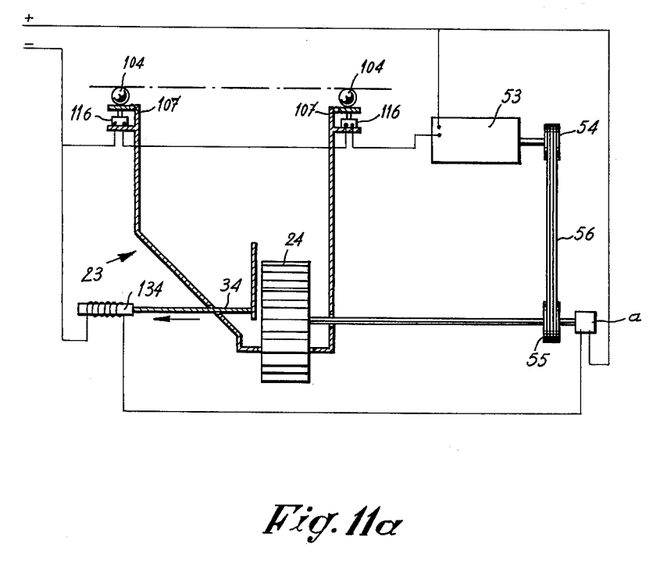
FIGURE 11a is a diagram illustrating the control means.
Figure 12:
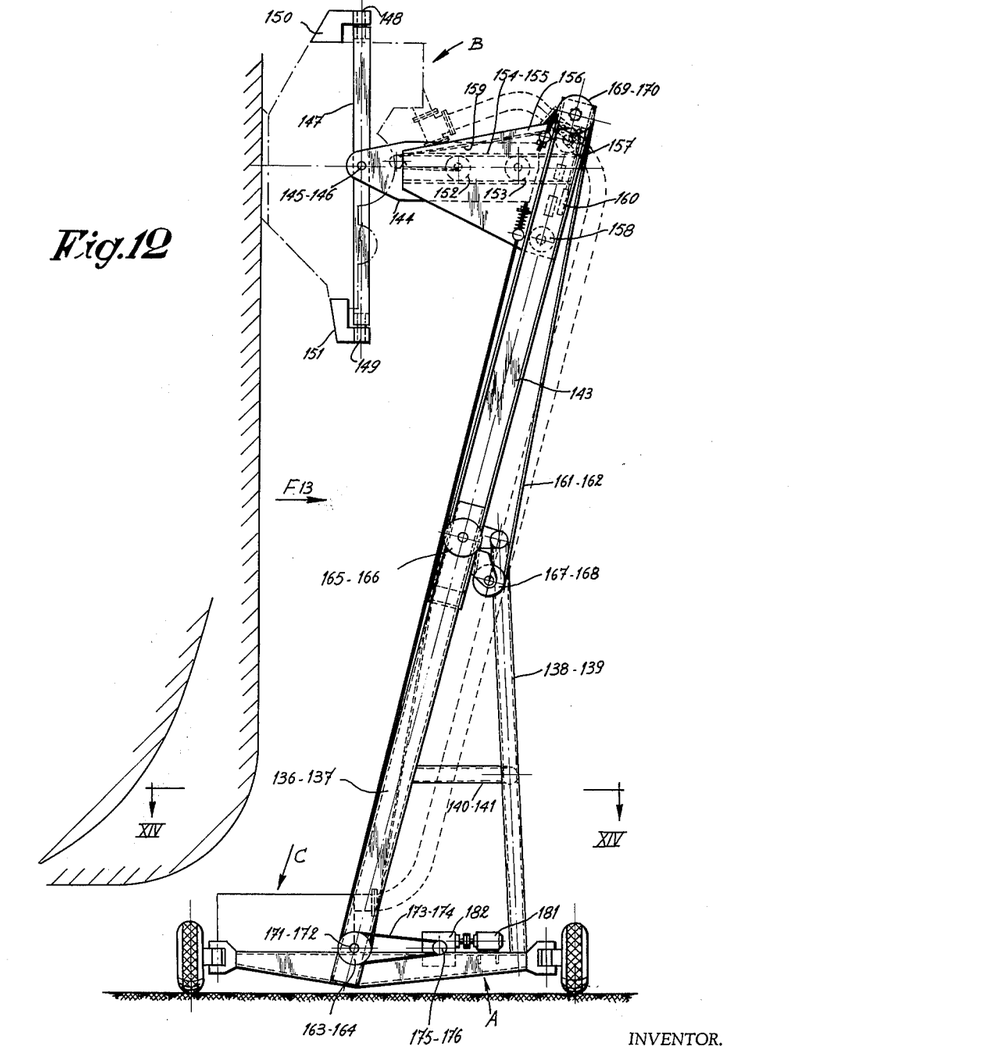
FIGURE 12 is a diagrammatic vertical section of another embodiment of the apparatus according to the invention, more particularly intended for vertical or very inclined, plane or curved surfaces, the apparatus being represented in a characteristical position.
Figure 13:
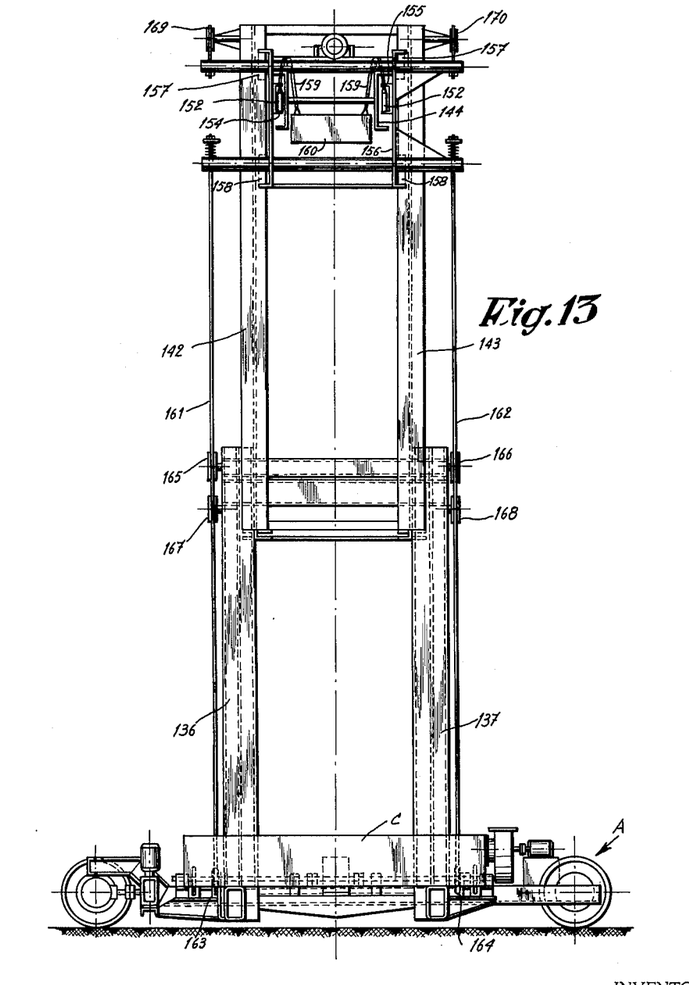
FIGURE 13 is a front view according to the arrow F13 of FIGURE 12, the projection tank being not represented for more clearness.
Figure 14:
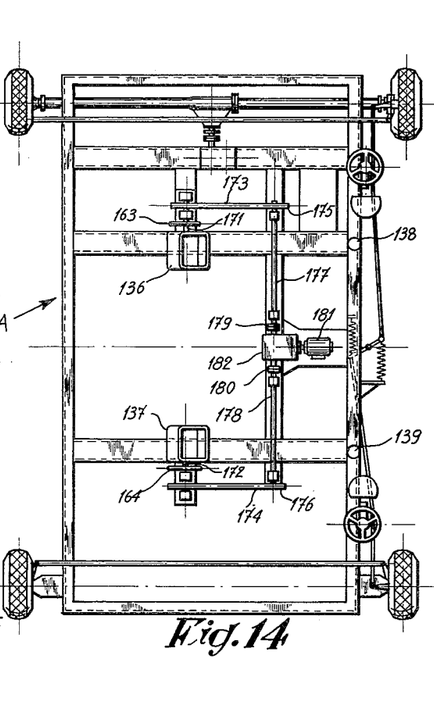
FIGURE 14 is a section on the line XIV—XIV of FIGURE 12.

As best shown in FIG. 11a, the tight junction is obtained by controlling the circuit feeding the motor 53 by the microswitches 116. They can close only when the peripheral edge of the projection tank 23 is firmly pressed against the surface to be treated. Actually it is this pressure which closes the microswitches and they are kept closed so long as the pressure subsists. Then the motor 53 is actuated; it drives the centrifugal projector 24 by the belt connection consisting of pulleys 54 and 55 and belts 56.

In order to actuate the projector 54 only when it has acquired full speed, the supply of grains to the bottom of the tank 23, where the projector 24 is actuated, is obstructed by a slide or shutter 34. The position of the shutter 34 is controlled by the magnetic device 134, while the supply of current to the magnetic device 134 is controlled by any suitable tachometer $a$ operatively connected with the motor 53.

Initially the abrasive grains are held back by the shutter 34. When the required speed is reached, the tachometer allows the passage of current to the magnetic device 134. Then the device 134 attracts the shutter 34 which then frees the access to the bottom of the tank 23. At that time the actuation of the projecting means 24 is normalized. From that time, the apparatus is in normal operating conditions. The worker seated on the seat (not represented) provided on the platform 22 has then only to move his vehicle to sweep progressively the whole surface being treated in one or several passages with the projection tank 23. The vehicle is such that it substantially allows all straight or sinuous movements as well in frontward as in backward running. The vehicle is steered by the worker from the steering wheel 11, whereas it is propelled preferably automatically.

The efficiency of this apparatus is particularly surprising and determined by the particular conditions, in which the shots are projected and in which the circuit is established continuously for the feeding and the output of the centrifugal projecting means.

In fact, as represented more particularly in FIGURE 10, it is seen that the shots are substantially projected in the direction of the arrow F10 under a certain angle with respect to the plane Y—Y of the surface being treated.

Due to the setting of a vectorial decomposition, it results that, after the impact, the shots are moved substantially in the direction of the arrow F10 directly towards the compartment 29, from which they may flow normally through the inclined plane 31 to the rational feeding of the centrifugal projecting means 24. On the other hand, above the inlet of the said compartment 29, there is provided the air outlet 38 duly protected by the grating 39–40. As a consequence, before the inlet of the said compartment 29, there is automatically obtained the separation between the shots, on one hand, and the air and the powdery material resulting from the blasting action of the said shots, on the other hand. Air and the said suspended dust are entrained through the said grating and they come through the flexible tube 76 and the inlet 77 into the dust removal chamber 78. Air and the said suspended dust are sucked towards or against the filtering strip 86 due to the underpressure setting of the second compartment of the filtering means by means of the fan 93. It results that air passes through the filtering strip 86 and is exhausted through the outlet 79 and the fan 93. On the contrary, the dust and all the solid materials previously suspended within air are separated therefrom. These materials are falling freely for a major part into the chamber 78 and they are partially adhering against the said filtering strip 86. They are removed therefrom under the action of the shaking device.

The efficiency of the apparatus is also promoted due to the fact that owing to the configuration and the relative position of the projection tank and the centrifugal projecting means 24, there is outlined a relatively long and narrow impact surface represented by S (FIGURE 1), so that all the kinetic energy of a relatively substantial proportion of shots formed with very hard elements is concentrated on the said surface, which is shifted progressively at a duly predetermined speed, thereby resulting generally in a very clean appearing surface, whatever the surface being treated may be and even after only one passage.

It will be observed that this operation is carried out by only one worker under maximum ease, safety and healthy conditions. If, for any reason, e.g. an accidental resistance, the working speed of the projecting means 24 would be reducing, the feeding thereof would be stopped substantially instantaneously by the appropriate shifting of the slide 34 and this accidental fact could be readily signalized to the board 21, e.g. by a visual or audible signal. Similarly, if the general feeding of the apparatus would be interrupted, i.e. if the energization of the electro-magnetic device 134 would be interrupted, e.g. due to a network breakdown, the said slide 34 would be also brought into the closing position under the action of the release spring 125.

It will be observed that the same apparatus may treat, under the same efficiency conditions, plane, curved or skew surfaces and in certain limits, horizontal or slightly inclined surfaces. In fact, the upper resilient lining 45–52 is such that it allows a substantial taking up of the level difference between the various points of the surface being treated. For this purpose, one of the arms 64 may swing about two orthogonal axes 65, 71 respectively.

It is apparent that the apparatus described hereabove is in no manner limitative and that it may be provided according to the nature, the importance and principally the profile and the position of the surfaces being treated.

In another characteristical embodiment, the same process and the same essential elements will be provided for treating vertical or very inclined, plane or curved surfaces, exactly under the same conditions as those previously described for horizontal or slightly inclined, plane or curved surfaces.

By way of indication only, such embodiment is summarily represented in FIGURES 12 to 15. In these figures, there is met again the essential elements of the apparatus, namely the carriage A, the projecting means B and the filtering means C.

Owing to the particular position of the surfaces being treated, this embodiment is characterized in that, between the proper vehicle A and the projecting means B, there is interposed a suitable support, in a manner complementary to the previously described embodiment. This special support consists namely of a telescopic framework allowing to sweep vertically relatively important heights. This framework consists substantially of two posts 136–137 fixed with respect to the vehicle and firmly held by the latter through the intermediary of bracings 138–139 and several struts represented by way of example in 140–141.

Both posts 136–137 serve as telescopic guides for two extensions 142–143 respectively. The latter may be secured along the said posts 136–137, so that the height of the framework, along which the projecting means B is shifted, may be previously adjusted. Since the said projecting means may be itself shifted by a translation movement along the said extensions 142–143, it is then possible, by means of this characteristical arrangement, to sweep a vertical or very inclined, plane or curved surface from a level very near the ground up to a relatively very high level. For this purpose, the projection tank 23 is made integral with the said framework by the following means: instead of the swinging arm 57–64 of the previous embodiment, the projection tank is connected to a carriage 144 through coaxial pins 145–146 integral with a frame 147, which has two other coaxial pins 148–149 perpendicular to the former and engaged with an easy fit with seats 150–151 integral with the said projection tank 23, thereby forming a universal joint between the said projection tank 23 and the said carriage 24.

The said carriage 144 may run through the intermediary of sets of rollers 152–153 in rolling pathes 154–155 respectively, serving as a small carriage 156, which may be shifted along the said extensions 142–143 through sets of rollers 157–158. The shiftings of the projecting means B with respect to the small carriage 156 are provided through a cable 159 leaning on suitable rollers and to which is hung such a counter-weight 160 that the projection tank 23 is firmly and permanently applied against the surface being treated through its above described resilient lining.

In fact, the shiftings of the said carriage are resulting from a continuous movement comprising, on one hand, a relative translation with respect to the extensions 142–143 and, on the other hand, a relative translation between the said extensions and the posts 136–137. This combined movement is obtained through the intermediary of cables 161–162 fixed, on one hand, to the lower part of the carriage 156 and extended, on the other hand, down to the bottom of posts 136–137, where they are leaning on a pulley 163–164 respectively and on the intermediary pulleys 165–166 and 167–168 respectively, the axis of the two first pulleys leaning on the lower portion of the framework integral with the carriage A, whereas the axis of the two latter leans on the extensions 142–143. Finally, the said cables 161–162 are leaning on the upper pulleys 169–170 and their adjoining free end is fixed to the corresponding upper portion of the carriage 156. The axes 171–172 of the lower pulleys 163–164 respectively are connected, through belts 173–174 respectively, with pulleys 175–176 respectively, keyed at the end of axes 177–178 respectively. The latter are connected by means of couplings 179–180 respectively with an electric motor 181 through a suitable reducing gear 182. With this arrangement and the length of the cable 161–162 remaining constant, the carriage 156 and all the elements integral therewith may be shifted from top to bottom or from bottom to top owing to the above double translation movement.

Figure 15:
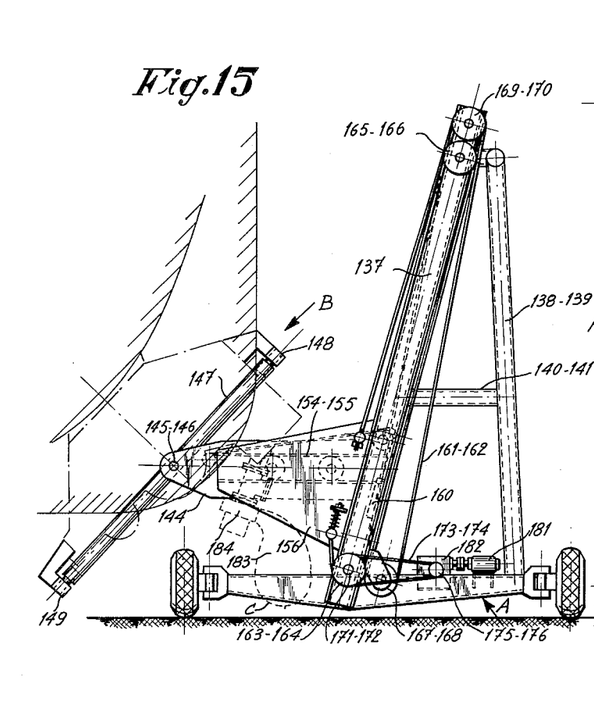
FIGURE 15 is similar to FIGURE 12, the apparatus being represented in another characteristical position.

The flexible tube 76 for the suction of the air charged with the powdery waste products resulting from the blasting will be generally used when the work is effected at some height, whereas when working at a small distance from the ground, a simple filtering bag 183 may be connected, as represented in FIGURE 15, with the outlet 38 of the projecting means, of course together with a fan 184 duly interposed and fitted.

It is apparent that all the auxiliary arrangements may be introduced according to the intended applications.

As generally as possible, there may be thus combined, within the scope of the invention, any carriage or vehicle with an appropriate moving device, any projecting means capable of acting with a substantial kinetic energy on a relatively reduced surface of the surface being treated by moving progressively the said projection surface and, between the said vehicle and the said projecting means, any support appropriated to the surfaces or to the direction of the surfaces being treated. In addition, the so constructed and appropriate apparatus may be completed by any member, instrument and device capable of operating the same under safety, ease and efficiency conditions, the application of the said known means effecting in no way any modification to the process or to the fundamental features characterizing the apparatus of the invention.

What I claim is:

1. An apparatus for abrading surfaces by impact thereon of a continuous jet of small abrasive bodies traveling at high velocity, said apparatus comprising a housing having a first air outlet, rotary propulsion means within said housing for propelling said abrasive bodies to produce, impact and recycle said jet of abrasive bodies, said housing having a second outlet for expelling said bodies therefrom and a return passage through which said bodies after impact and rebound on the surface to be treated, are fed back to said rotary propulsion means, means comprising a suction pump, an air filter and a conduit connecting said first air outlet with said air filter for abstracting and purifying air through said first air outlet and control means for producing said jet of abrasive bodies only when the rotary speed of said propulsion means exceeds a predetermined value and when there is a tight junction between said second outlet of the housing and the surface to be treated.

2. An apparatus in accordance with claim 1, wherein said air filter comprises a vessel having two compartments, an inlet for polluted air communicating with the first compartment thereof, an outlet for purified air communicating with the second compartment thereof, and means comprising a multiply folded accordion-shaped strip of filtering cloth and staggered upper and lower bars supporting said strip, said means separating said first and second compartments from each other, said first compartment constituting a removable waste product collecting vessel.

3. An apparatus in accordance with claim 1, wherein said air filter comprises a vessel having two compartments, an inlet for polluted air communicating with the first compartment thereof, an outlet for purified air communicating with the second compartment thereof, means comprising a multiply folded, accordion-like strip of filtering cloth and staggered upper and lower bars supporting said strip, said means separating said first and second compartments from other, shaking means comprising a grid-like structure of bars located at an intermediate level between said upper and lower bars and means for imparting reciprocating longitudinal motion to said grid-like structure to alternately beat up adjacent folds of said folded strip of filtering cloth.

4. An apparatus in accordance with claim 1, wherein said control means comprise a slide valve disposed in said return passage and movable with respect thereto so as to close and open said return passage, electromagnetic means comprising a mobile armature coupled with said slide valve and causing said slide valve to open said return passage when said electromagnetic means are energized, means responsive to the rotary speed of said propulsion means and electrically coupled with said electromagnetic means to energize the latter as soon as the rotary speed of said propulsion means exceeds a predetermined value.

5. An apparatus in accordance with claim 1, wherein said control means comprise a slide valve disposed in said return passage and movable with respect thereto so as to close and open said passage, means coupled with said slide valve and responsive to the rotary speed of said propulsion means to act on said slide valve so as to cause said return passage to be opened as soon as the rotary speed of said propulsion means exceeds a predetermined value.

6. An apparatus in accordance with claim 5, further comprising electrical motor means for imparting a rotary movement to said propulsion means, and wherein said control means comprise a normally open electrical feed circuit for said motor means, a plurality of sensing devices disposed around and adjacent the rim of said second outlet so as to contact the surface to which said opening is applied, said sensing devices controlling said normally open feed circuit to close the latter only when all of said sensing devices are in operative contact with the surface to be treated.

7. An apparatus in accordance with claim 6, wherein said sensing devices consist of pressure-operated switches, and actuating means protruding from a plane determined by the rim of said outlet-inlet opening and closing said feed circuit when said opening is tightly applied to the surface to be treated.

References Cited by the Examiner
UNITED STATES PATENTS

| | | | |
|---|---|---|---|
| 2,507,166 | 5/1950 | Lehman | 51—9 |
| 2,729,918 | 1/1956 | Van Denburgh | 51—8 |
| 2,770,924 | 11/1956 | Mead et al. | 51—8 |
| 2,773,339 | 12/1956 | Bischoff et al. | 51—320 |
| 2,810,991 | 10/1957 | Mead et al. | 51—8 |
| 3,015,913 | 1/1962 | Anderson | 51—9 |
| 3,034,262 | 5/1962 | Pawlson | 51—9 |
| 3,055,150 | 9/1962 | Greenberg et al. | 51—14 |
| 3,067,021 | 12/1962 | Pelley et al. | 51—320 |

FOREIGN PATENTS 112,648 11/1925 Switzerland.

LESTER M. SWINGLE, *Primary Examiner.*

JOHN C. CHRISTIE, *Examiner.*